United States Patent
Chih et al.

(10) Patent No.: US 6,859,356 B2
(45) Date of Patent: Feb. 22, 2005

(54) APPARATUS FOR SUPPORTING A MONITOR

(75) Inventors: Ting-Hui Chih, Hualien (TW); Chi-Jung Wu, Taoyuan (TW)

(73) Assignee: BENQ Corporation, Taoyuan (TW)

( * ) Notice: Subject to any disclaimer, the term of this patent is extended or adjusted under 35 U.S.C. 154(b) by 125 days.

(21) Appl. No.: 10/208,844

(22) Filed: Aug. 1, 2002

(65) Prior Publication Data

US 2003/0024073 A1 Feb. 6, 2003

(30) Foreign Application Priority Data

Aug. 3, 2001 (TW) ........................................ 90213251 U

(51) Int. Cl.$^7$ ................................................. G06F 1/16
(52) U.S. Cl. ........................................ 361/681; 361/686
(58) Field of Search ................................. 361/681, 686

(56) References Cited

U.S. PATENT DOCUMENTS 5,113,360 A * 5/1992 Satou ........................... 361/680
5,566,048 A * 10/1996 Esterberg et al. ........... 361/681

* cited by examiner

Primary Examiner—Yean-Hsi Chang
(74) Attorney, Agent, or Firm—Rabin & Berdo, P.C.

(57) ABSTRACT

A hinge assembly for pivotably connecting the display portion and the body portion of the portable computer comprises a first fastening portion for attaching to the display portion, a second fastening portion for attaching to the body portion, and a pivot portion for pivotably connecting the first fastening portion with the second fastening portion. The second fastening portion also has a first support arm for horizontally inserting into the insertion hole. The cables, for transmitting signals and power extending from the display portion, are electrically connected through connectors to the cable connection region. The cable connect region is formed on the rear wall or bottom wall of the body portion. The hinge assembly of the invention greatly reduces the extraordinary sound resulting from the rotation of the display portion. Also, some covering components can be eliminated to make the assembly much easier.

33 Claims, 10 Drawing Sheets

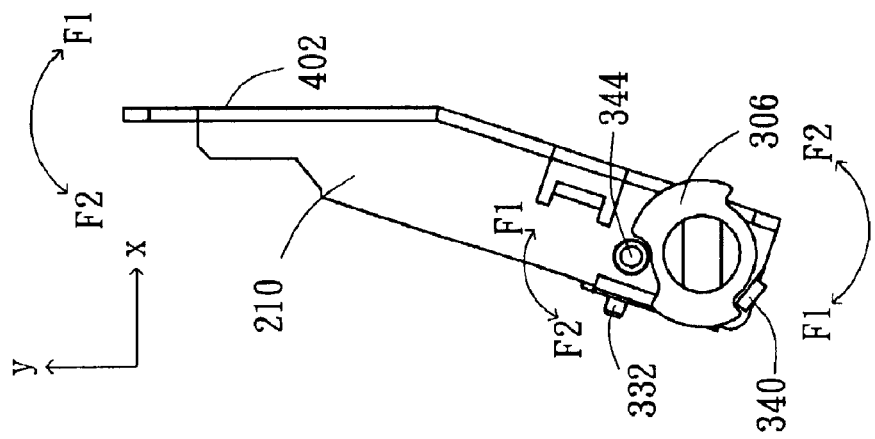
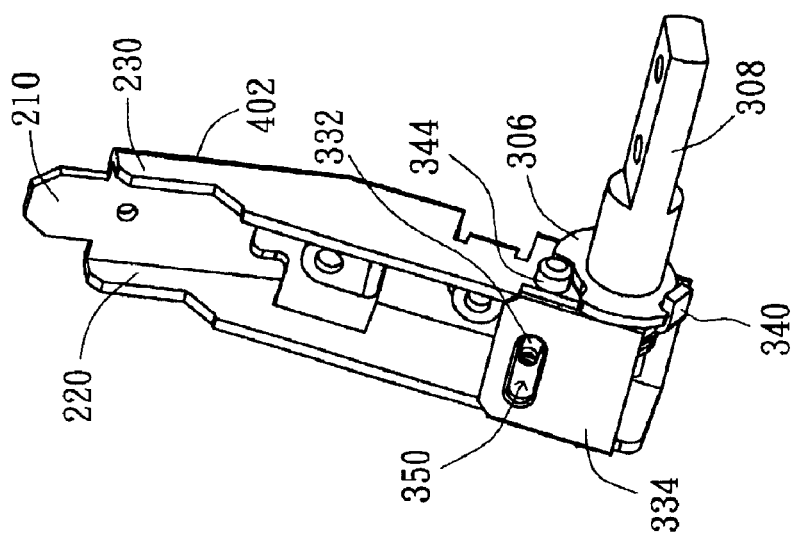
FIG. 4B
FIG. 4A

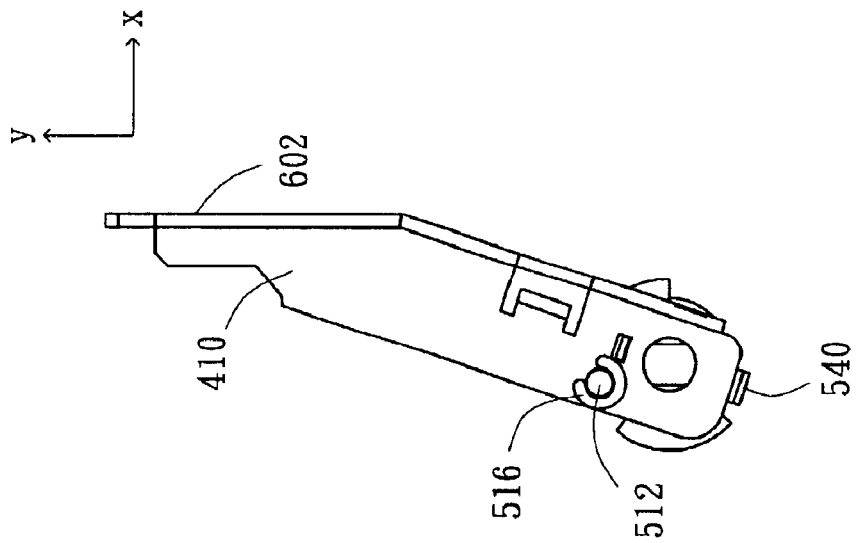
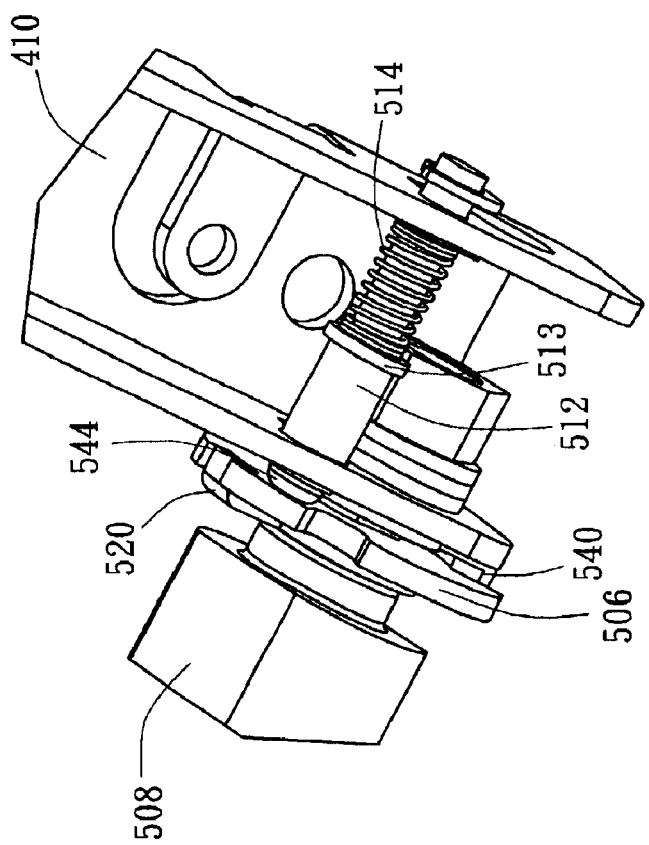
FIG. 7A
FIG. 7B

APPARATUS FOR SUPPORTING A MONITOR

This application incorporates by reference of Taiwan application Serial No. 90213251, filed Aug. 3, 2001.

BACKGROUND OF THE INVENTION

1. Field of the Invention

The invention relates in general to an apparatus for supporting a monitor, and more particularly to an apparatus for supporting a liquid crystal display (LCD) and rotating the LCD with respect to the base.

2. Description of the Related Art

In order for a monitor, such as a liquid crystal display (LCD), to be rotated forward and backward, the supporting apparatus of the monitor or the LCD need an angle adjustment design. Generally, the apparatus for supporting the LCD comprises a supporting arm for leading the rotation of LCD, wherein the supporting arm is fastened to the lower side of LCD.

FIG. 1A is a side view of a conventional apparatus for supporting the LCD. The conventional apparatus for supporting the LCD comprises a shaft 102, the angle control elements 104a and 104b, and the clasps 106a and 106b mounted on the shaft 102. Additionally, a pedestal 108 is provided for the apparatus for supporting the LCD. During assembly, the assembled shaft 102 is inserted through the holes of the pedestal 108 and the supporting frame 110, and then secured by the screw caps 112a and 112b. The frictional torques on the two ends of the shaft 102 are produced, due to the rotation of apparatus, and the magnitudes thereof are different. For example, one end of shaft 102 (close to the screw cap 112a) produces 45 kg/m of frictional torque, and the other end (close to the screw cap 112b) produces 25 kg/m of frictional torque. Also, the shaft 102 is a combination of sectional cores; for example, two cores are respectively situated in the right and left sides of the angle control element 104a. The supporting frame 110 embedded in a supporting arm can be rotated in a small angle range by gently applying an external force; meanwhile, the whole shaft 102 is rotated with respect to the supporting frame 110. If greater external force is applied to the supporting frame 110, the supporting frame 110 can be rotated to a larger angle; meanwhile, only one core is rotated with respect to the supporting frame 110 and the other core is sustained in the stationary state.

FIG. 1B and FIG. 1C are side views of the angle control elements in FIG. 1A. It is assumed that the LCD can be rotated in the range of 2 degrees forward and 60 degrees backward. There is a cut on the upper edge of the angle control element 104a, as shown in FIG. 1B. The cut, divided by the central line (dash line), is split into a 2-degree angle and a 20-degree angle. There is a cut on the lower edge of the angle control element 104b, as shown in FIG. 1C. The cut, divided by the central line (dash line), is split into two 60-degree angles. When the supporting frame 110 of the LCD is vertical to the base, the central lines of the angle control elements 104a and 104b are parallel to the clasps 106a and 106b, respectively. When the LCD is rotated, the shaft 102 is rotated with respect to the supporting frame 210, and the clasps 106a and 106b respectively slide along the cuts of the angle control elements 104a and 104b. When the clasps 106a and 106b hit the risen edges of the angle control elements 104a and 104b, rotation of the supporting frame 110 stopped. If the supporting frame is rotated in the range of 2 degrees forward to 20 degrees backward, the whole shaft 102 is driven. If it is desired to rotate the supporting frame 110 to 60 degrees backward, then a larger force is needed for driving the shaft core at the left side of the angle control element 104a; meanwhile, the shaft core at the right side of the angle control element 104b is sustained, and the clasp 106 keeps sliding along the edge of the cut of the angle control element 104b until hitting the risen edge thereof.

According to the description above, the conventional apparatus for supporting the LCD has a drawback of highly cost due to the combination of the two sectional cores. In addition, magnitude of the frictional torques on the two ends of the shaft 102 are different, the end of the shaft 102 producing less frictional torque being weaker than the other end and easier to be damaged. Also, manual adjustment for adjusting the produced torques is required during assembly. It is time-consuming and labor-intensive. If the diameter of the core is increased for bearing the larger external force, the size of the apparatus for supporting the LCD also increases. Additionally, a pedestal is required on which the apparatus for supporting the LCD is mounted, thereby restricting the potential for developing a lighter and smaller base of the monitor.

SUMMARY OF THE INVENTION

It is therefore an object of the invention to provide an apparatus for supporting a monitor, in which the mechanical apparatus to rotate the monitor with respect to the base has great position effect, and the durability of the components of the apparatus is improved because the components are not easy to be aged.

According to the objective of the invention, an apparatus for supporting a monitor is provided, wherein the monitor connected to the base is rotatable. The apparatus comprises a supporting frame, a latching assembly, and a shaft assembly, wherein the latching assembly and the shaft assembly are mounted on the supporting frame. The supporting frame has a first sidewall and a second sidewall. The latching assembly comprises a tenon, wherein two ends of the tenon are a protrusive portion and a conjunctive portion. Between the protrusive portion and the conjunctive portion is the main body of the tenon. The protrusive portion projects through the second tenon hole of the second sidewall. Also, a control bar connected to the tenon is used for driving the tenon. The shaft assembly comprises a rotation control unit, a shaft base, and a plurality of washers. There are a first U-shaped cut and a second U-shaped cut in the edge of the rotation control unit. When the supporting frame is rotated, the protrusive portion slides along the edge of the first U-shaped cut and the hook slides along the edge of the second U-shaped cut, so that the monitor can be rotated in a first angle range. By moving the control bar, the protrusive portion will not couple to the first U-shaped cut and move toward the interior of the supporting frame, so that the monitor can be rotated in a second angle range.

According to the objective of the invention, another apparatus for supporting a monitor is provided, comprising a supporting frame, a lock assembly, and a shaft assembly. The supporting frame has a first sidewall and a second sidewall. The lock assembly comprises a lock pin and a spring. The ends of the lock pin are a protrusive portion and a conjunctive portion for receiving the spring. The spring is used for providing elastic recover force acting on the protrusive portion, so as to project the protrusive portion behind the second sidewall. There are a first U-shaped cut and a second U-shaped cut in the edge of the rotation control unit. The protrusive portion is coupled to the surface of the rotation control unit. The hook couples to the second U-shaped cut. When the supporting frame is rotated, the protrusive portion slides along a surface of the rotation control unit and the hook slides along the edge of the second U-shaped cut, so that the monitor can be rotated in a first angle range. When the supporting frame is rotated to a predetermined angle, the lock pin is pushed by the elastic recover force of the spring, so as to project the protrusive portion behind the second sidewall. If the supporting frame is further rotated, the protrusive portion is consequently uncoupled from the first cut, so that the monitor can be rotated in a second angle range.

Other objects, features, and advantages of the invention will become apparent from the following detailed description of the preferred but non-limiting embodiments. The following description is made with reference to the accompanying drawings.

BRIEF DESCRIPTION OF THE DRAWINGS

FIG. 4A is a perspective view of the assembled apparatus for supporting the monitor according to the first embodiment of the invention, while the LCD is vertical to the base;

FIG. 4B is a side view of the apparatus of FIG. 4A;

FIG. 7A is a perspective view of the assembled apparatus for supporting the monitor according to the second embodiment of the invention, while the LCD is vertical to the base;

FIG. 7B is a side view of the apparatus of FIG. 7A;

DETAILED DESCRIPTION OF THE INVENTION

Figure 1A:
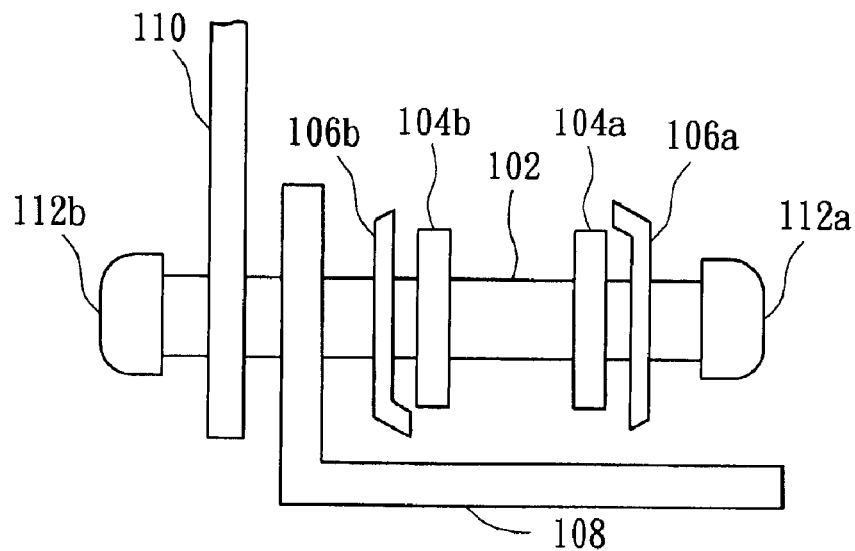
FIG. 1A (prior art) is a side view of a conventional apparatus for supporting the LCD.
Figure 1B:
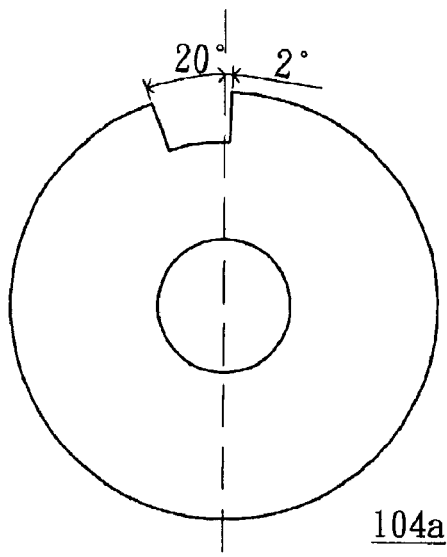
FIG. 1B and FIG. 1C (prior art) are side views of the angle control elements in FIG. 1A.
Figure 1C:
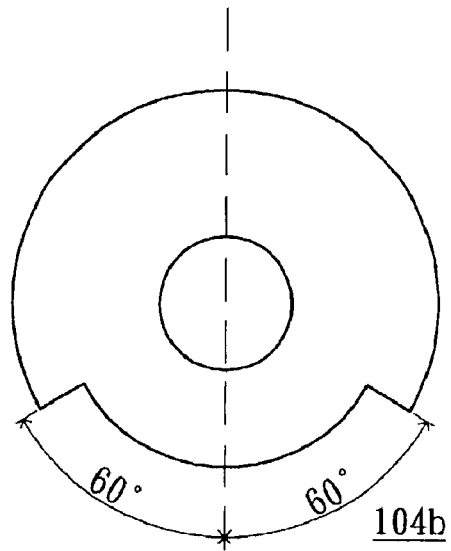

The apparatus for supporting a monitor of the invention, particularly for connecting the liquid crystal display (LCD) and the base, allows the mechanical pivoting of the LCD on the base within a certain range. Also, the invention is further designed so that the LCD equipped with the apparatus can be folded to 90 degrees, for increased portability. In the preferred embodiments, the LCD rotating in the range of 2 degrees forward to 25 degrees backward and further folding to 90 degrees is taken for illustration. In the first embodiment (example 1), the purpose of positioning the LCD is achieved by cooperation of a rotation control unit and a tenon. In the second embodiment (example 2), the purpose of positioning the LCD is achieved by cooperation of a rotation control unit and a lock pin.

In the following description, the preferred examples are taken for illustrating the invention, but the invention is not limited hereto. Also, to avoid obscuring the invention, well-known elements not directly relevant to the invention are not shown nor described. Accordingly, the specification and the drawing are to be regarded in an illustrative sense rather than a restrictive sense.

EXAMPLE 1

Figure 2A:
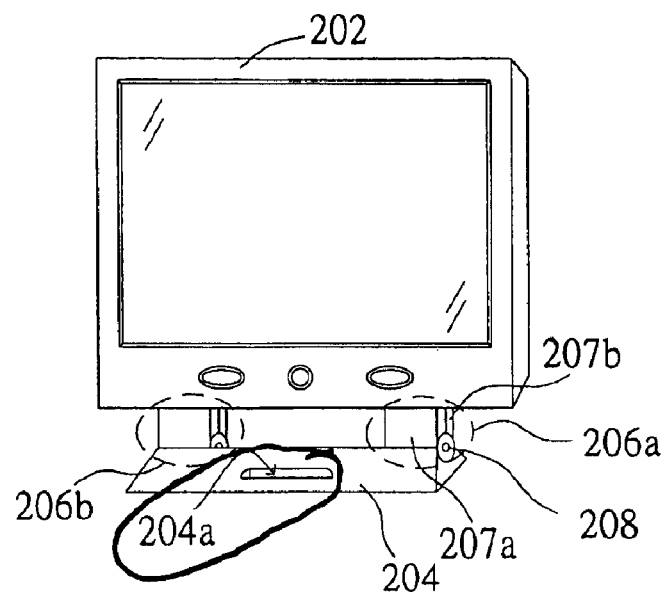
FIG. 2A is a perspective view of the LCD assembled with the apparatus for supporting the monitor according to the first embodiment of the invention.
Figure 2B:
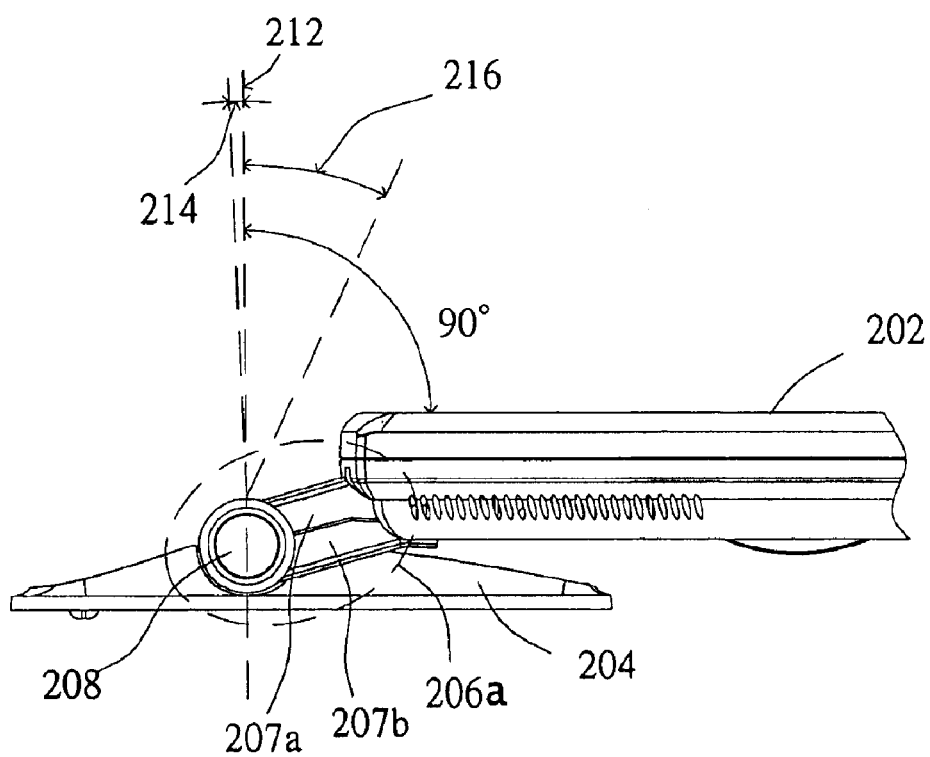
FIG. 2B is a side view of the LCD assembled with the apparatus for supporting the monitor according to the first embodiment of the invention.

FIG. 2A is a perspective view of an LCD assembled with the apparatus for supporting the monitor according to the first embodiment of the invention. In FIG. 2A, the LCD 202 is connected to the base 204 by two supporting arms 206a and 206b. FIG. 2B is a side view of the LCD assembled with the apparatus for supporting the monitor according to the first embodiment of the invention. In FIG. 2B, the LCD is tilted forward, away from the vertical central line 212, and positioned in the first angle 214 (set up as 2 degrees herein). The LCD is tilted backward away from the vertical central line 212 and positioned in the second angle 216 (set up as 25 degrees herein). Also, the LCD can be folded backward to 90 degrees, which is in parallel with the base 204. A belt-shaped portion is further created in the base 204, so that the user can easily carry the LCD by holding the belt-shaped portion 204a. The apparatus for supporting a monitor is equipped inside the supporting arm 206a or 206b. The supporting arm 206a (or 206b) is assembled by two housings 207a and 207b, one side of which the engaging housings 207a and 207b are screwed by a fastening cover 208 to ensure the fixing thereof. The details of the apparatus for supporting a monitor of the invention are illustrated below.

Figure 3A:
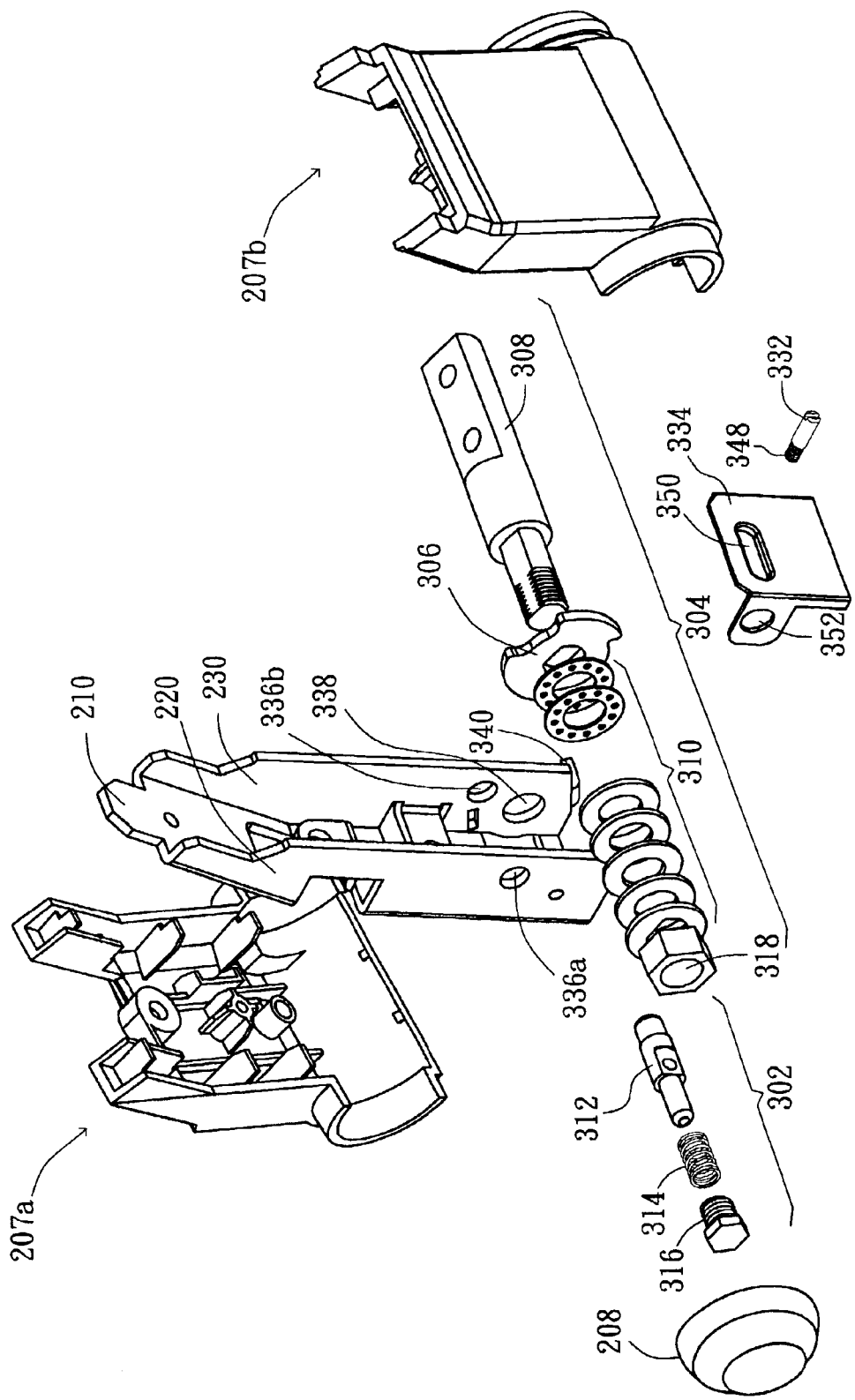
FIG. 3A is a disassembled view of the apparatus for supporting the monitor according to the first embodiment of the invention.
Figure 3B:
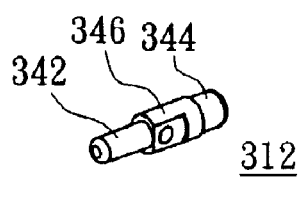
FIG. 3B is a perspective view of the tenon of FIG. 3A.

FIG. 3A is a disassembled view of the apparatus for supporting the monitor according to the first embodiment of the invention. The apparatus for supporting the monitor comprises a latching assembly 302 and a shaft assembly 304 coupled to a supporting arm 210. The latching assembly 302 includes a tenon 312, a spring 314, and a control bar 332. FIG. 3B is a perspective view of the tenon of FIG. 3A. In FIG. 3B, one end of the tenon 312 has a protrusive portion 344 while the other end has a conjunctive portion 342, according to their operating functions. Between the protrusive portion 344 and the conjunctive portion 342 is the main body 346 of the tenon 312.

Figure 3C:
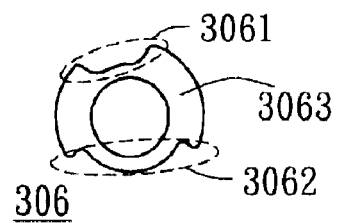
FIG. 3C is a front view of the rotation control unit of FIG. 3A.
Figure 3D:
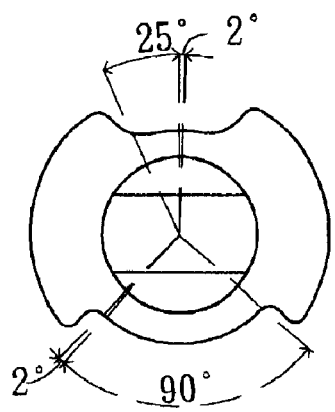
FIG. 3D shows the ranges of the angles of the rotation control unit of FIG. 3A.

The shaft assembly 304 includes a rotation control unit 306, a shaft base 308, a plurality of washers 310, and a screw 318. FIG. 3C is a front view of the rotation control unit of FIG. 3A. The rotation control unit 306 is a metallic plate with the U-shaped cuts. There are a first U-shaped cut 3061 and a second U-shaped cut 3062 formed in the edge of the rotation control unit 306; also a central opening 3063 is formed in the center of the rotation control unit 306. The first U-shaped cut 3061 is created to control the rotation angle of the LCD, so as to enable the LCD to tilt in the range of 2 degrees forward and 25 degrees backward. The second U-shaped cut 3062 is created for enabling the LCD to tilt in the range of 2 degrees forward and 90 degrees backward. FIG. 3D shows the ranges of the angles of the rotation control unit of FIG. 3A.

Figure 3E:
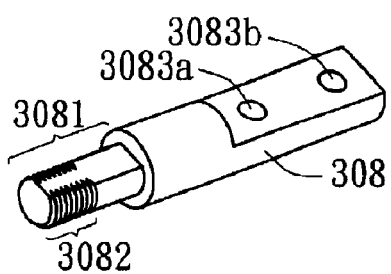
FIG. 3E is a perspective view of the shaft base of FIG. 3A.

FIG. 3E is a perspective view of the shaft base of FIG. 3A. One end of the shaft base 308 has a conjunctive portion 3081, and a number of threads 3082 are formed on the top of the conjunctive portion 3081. The rotation control unit 306 and the washers 310 fit onto the conjunctive portion 3081 of the shaft base 308. Additionally, there are two threaded holes 3083a and 3083b on the other end of the shaft base 308, associated with another threaded holes on the LCD base 204, for securing the shaft base 308 on the base 204 by the use of a bolt. When the LCD 202 rotates with the base 204 (see FIG. 2), the supporting frame 210 rotates with the shaft base 308 accordingly.

Figure 3F:
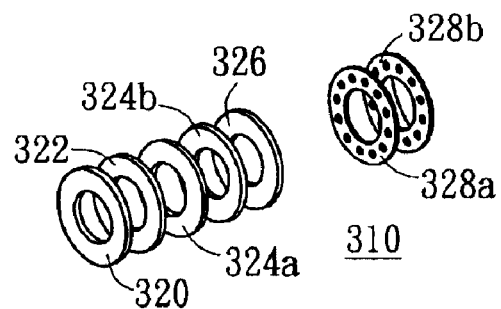
FIG. 3F is a perspective view of the washers of FIG. 3A.

Additionally, a number of washers 310 are designed for releasing the friction between the rotation control unit 306 and the shaft base 308, and also for providing the frictional torque. FIG. 3F is a perspective view of the washers of FIG. 3A. The washers 310 illustrated in an order from left to right are: a fix washer 320, a torque washer 322, two spring washers 324a and 324b, and three torque washers 326, 328a, and 328b. For achieving the objective of smooth rotation and long-term durability, seven washers are preferably used in example 1; however, the invention is not limited herein. The number and composition of the washers may be selectively varied to accommodate a wide range of LCD panel sizes, weights, and degrees of mass unbalance.

The circular holes are formed on the sidewalls of the supporting frame 210, in which the latching assembly 302 and the shaft assembly 304 are coupled. As shown in FIG. 3A, the supporting frame 210 includes a first sidewall 220 and a second sidewall 230. A first tenon hole 336a and a second tenon hole 336b are formed on the first sidewall 220 and the second sidewall 230, respectively. A shaft hole 338 is formed next to the second tenon hole 336b. Also, a hook 340 situated in the lower end of the second sidewall 230 projects outward. The latching assembly 302 is mounted on the supporting frame 210 through the first tenon hole 336a and the second tenon hole 336b. The shaft assembly 304 is mounted on the supporting frame 210 through the shaft hole 338. The hook 340 slides along the second U-shaped cut 3062 of the rotation control unit 306. When the hook 340 hits the risen edge of the second U-shaped cut 3062, the supporting frame 210 stops moving, and consequently the LCD stops rotating.

In the foregoing description, the components of the apparatus for supporting a monitor, such as the washers, the tenon, the supporting frame, and the rotation control unit, are hardened by thermo-treatment. The hardened components, not easy to be aged and broken, are employed to ensure that the applied LCD can be stably rotated in frequent use.

During assembly, the conjunctive portion 3081 of the shaft base 308 is inserted through the central opening 3063 of the rotation control unit 306, the shaft hole 338, and the washers, and then is secured on the second sidewall 230 of the supporting frame 210 by a fastener, such as a screw 318. It is noted that the opening of the fix washer 320 and the cross section of the conjunctive portion 3081 are not circular, but tangent to the shaft hole 338 and the openings of other washers. Next, the spring 314 slides on the conjunctive portion 342 of the tenon 312. The tenon 312 is then mounted between the first tenon hole 336a and the second tenon hole 336b, wherein the protrusive portion 344 is projected beyond the second sidewall 230.

Also, the control bar 332, inserted through the control slot 350 of the control bracket 334, is situated on the main body of the tenon 346 and can be moved along the control slot 350 by the user. When the control bar 322 is not pushed by an external force, the protrusive portion 344 projects beyond the second sidewall 230 and is coupled with the first U-shaped cut 3061. When the control bar 322 is moved toward the left hand side (FIG. 3A), the protrusive portion 344 is consequently moved toward the inner of the supporting frame 210 and compresses the spring 314. Therefore, the protrusive portion 344 can be removed from the first U-shaped cut 3061 by the movement of the control bar 332.

Subsequently, the two housings 207a and 207b, which have almost symmetrical structures, are engaged together so that the supporting frame 210 and the other components mounted thereon can be fully enclosed. Then, one side of the engaging housings 207a and 207b are screwed by a fastening cover 208 to complete the assembly.

The following description and related drawings illustrate the operation of the apparatus for supporting a monitor according to the first embodiment of the invention. It is assumed that the LCD monitor is rotated in the range of +2 degrees (tilted forward 2 degrees from the vertical line) to −25 degrees (tilted backward 25 degrees from the vertical line), and also folded to an angle of 90 degrees.

FIG. 4A is a perspective view of the assembled apparatus for supporting the monitor according to the first embodiment of the invention, while the LCD is vertical to the base. FIG. 4B is a side view of the apparatus of FIG. 4A. The front surface 402 of the supporting frame 210 is a plane for attaching the LCD (not shown). In FIG. 4A and FIG. 4B, the front surface 402 is parallel to the LCD and y-axis, and the base of the LCD is parallel to x-axis. It is defined that the angle of rotation is 0 degree while the LCD is vertical to the base. Meanwhile, the protrusive portion 344 of the tenon 312 and the hook 340 are coupled with the first U-shaped cut 3061 and the second U-shaped cut 3062 of the rotation control unit 306, respectively. Without application of an external force, the control bar 332, projected beyond the control bracket 334, stays in the right position of the control slot 350 (close to the second sidewall 230 of the supporting frame 210), and consequently the protrusive portion 344 projects beyond the second tenon hole 336b. If the LCD is rotated, then the shaft base 308 and the rotation control unit 306 are not able to rotate, but the supporting frame 210, the latching assembly 302 and the washers can rotate around the shaft base 308; therefore, the protrusive portion 344 and the hook 340 slide along the edges of the first U-shaped cut 3061 and the second U-shaped cut 3062 of the rotation control unit 306, respectively.

Simply saying, when the LCD is rotated toward the direction of F1 (see FIG. 4B), the protrusive portion 344 and the hook 340 respectively slide along the edges of the first U-shaped cut 3061 and the second U-shaped cut 3062 of the rotation control unit 306 in the direction of F1. If the LCD is rotated toward the direction of F2, the protrusive portion 344 and the hook 340 are moved toward the direction of F2.

Figure 5B:
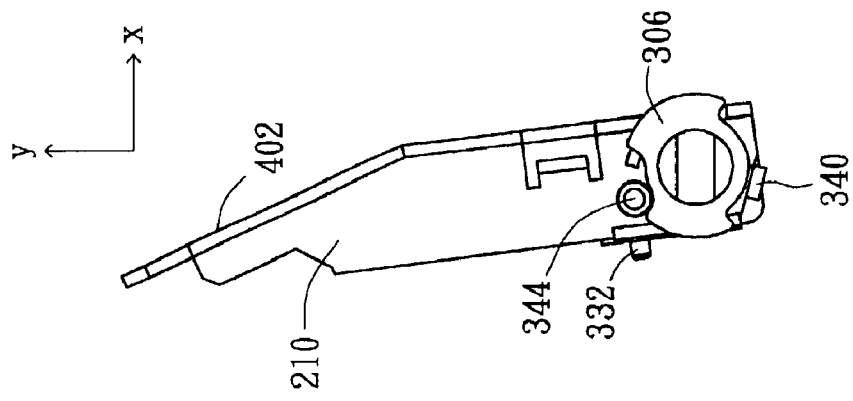
FIG. 5B is a side view of the apparatus of FIG. 5A.
Figure 5A:
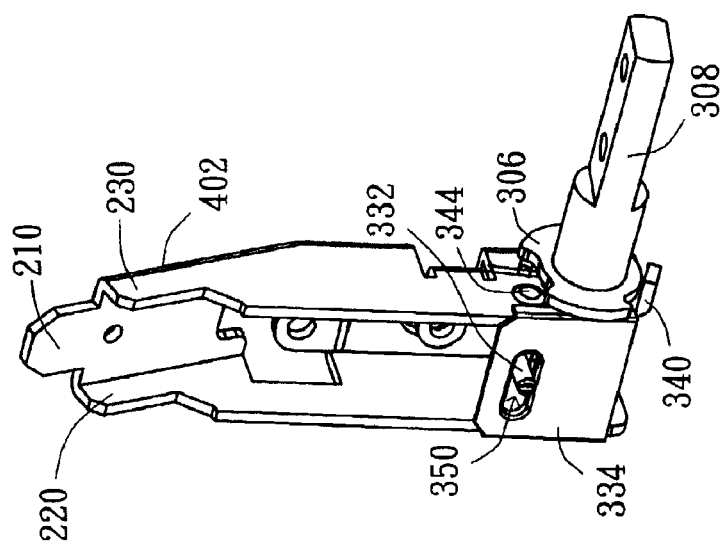
FIG. 5A is a perspective view of the assembled apparatus for supporting the monitor of the invention, while the LCD with the retracted is protrusive portion of the tenon is tilted backward at 25 degrees.

When the protrusive portion 344 hits the risen edge of the first U-shaped cut 3061 of the rotation control unit 306, the LCD stops rotating and is positioned at an angle of 25 degrees. If the rotation of LCD from the angle of 25 degrees to 90 degrees is desired, the protrusive portion 344 must be removed from the top of the first U-shaped cut 3061. FIG. 5A is a perspective view of the assembled apparatus for supporting the monitor of the invention, while the LCD with the retracted protrusive portion of the tenon is tilted backward to 25 degrees. FIG. 5B is a side view of the apparatus of FIG. 5A. It is clearly shown in FIG. 5A that the protrusive portion 344 is retracted away from the first U-shaped cut 3061 by moving the control bar 332 toward the second sidewall 220. The LCD can be folded to the angle of 90 degrees; meanwhile, the protrusive portion 344 slides against the rear surface of the rotation control unit 306.

In accordance with the description above, it is apparently indicated that the tilt angle of the LCD is determined by the sizes of the first U-shaped cut 3061 and the second U-shaped cut 3062 of the rotation control unit 306. However, the tilt angle of the invention is not limited in the range of 2 degrees forward to 25 degrees backward, and the fold angle, to 90 degrees. According to the practical application of the invention, the size of the first U-shaped cut 3061 is substantially associated with the first angle range, and the size of the second U-shaped cut 3062 is substantially associated with the second angle range.

Additionally, the apparatus for supporting a monitor can be further designed to rotate the LCD only in the first angle range, such as 2 degrees forward to 25 degrees backward, without the 90-degree folding design. Accordingly, the latching assembly 302 can be replaced with a protruding element so that the protruding element slides along the edge of the first U-shaped cut 3061. For example, the control bar 332 can be eliminated, or the latching assembly 302 is replaced with the protruding element, which is formed on the position of the second tenon hole 336b on the second sidewall 230. The protruding element could be the original protrusive portion 344, or a protruding element integrated with the supporting frame 210 as a whole.

It has been repeatedly tested by test engineers, and demonstrated that the mechanical apparatus for supporting a monitor of the invention has better position effect than the conventional supporting apparatus. Also, the LCD equipped with the apparatus for supporting a monitor of the invention is not easy to be aged, and the durability thereof is highly increased. Additionally, the overall size of the apparatus for supporting a monitor of the invention is much smaller, so that the space for connecting the LCD and the base can be decreased.

EXAMPLE 2

In this second embodiment, the structure and components are similar to those of the first embodiment. Generally, the purpose of positioning the LCD is achieved by cooperation of a rotation control unit with cuts, a lock assembly, and a hook. The details are illustrated below.

Figure 6A:
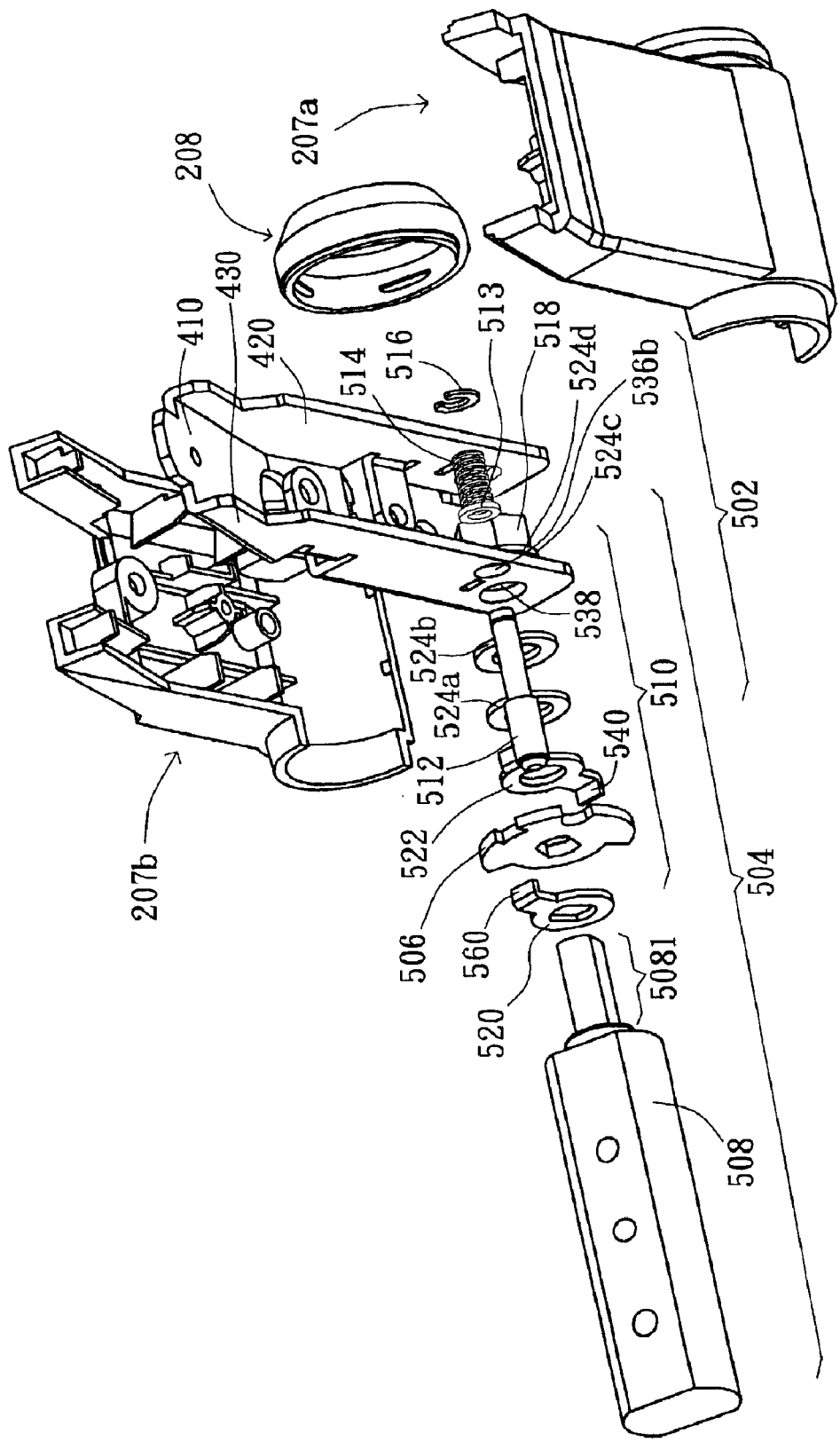
FIG. 6A is an enlarged perspective view of the apparatus for supporting the monitor according to the second embodiment of the invention.
Figure 6B:
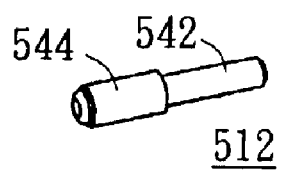
FIG. 6B is a perspective view of the lock pin of FIG. 6A.

FIG. 6A is a disassembled view of the apparatus for supporting the monitor according to the second embodiment of the invention. In the second embodiment, the apparatus for supporting a monitor comprises a supporting frame 410, a lock assembly 502, and a shaft assembly 504. The lock assembly 502 includes a lock pin 512 and a couple ring 516. FIG. 6B is a perspective view of the lock pin of FIG. 6A. One end of the lock pin 512 has a protrusive portion 544, and the other end has a conjunctive portion 542.

Figure 6C:
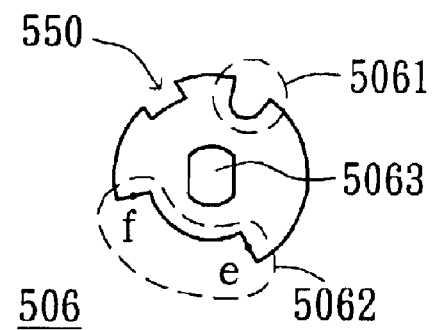
FIG. 6C is a front view of the rotation control unit of FIG. 6A.
Figure 6D:
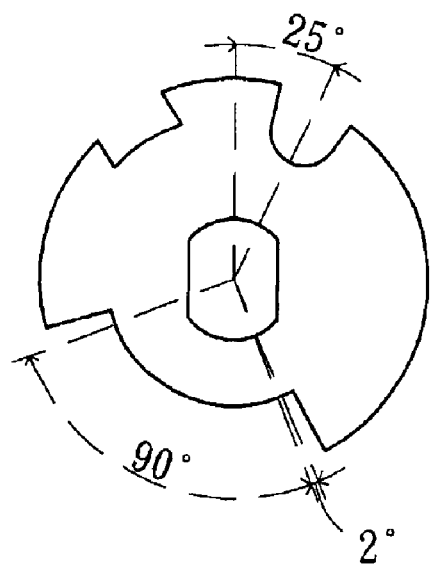
FIG. 6D shows the angles of the rotation control unit of FIG. 6A.

The shaft assembly 504 includes a rotation control unit 506, a shaft base 508, a plurality of washers 510, and a screw 518. FIG. 6C is a front view of the rotation control unit of FIG. 6A. The rotation control unit 506 is a metallic plate with the U-shaped cuts. There are a first U-shaped cut 5061 and a second U-shaped cut 5062 formed in the edge of the rotation control unit 506; also a central opening 5063 is formed in the center of the rotation control unit 506. When the LCD is rotated backward to an angle of 25 degrees, the protrusive portion 544 of the lock pin 512 couples to the first U-shaped cut 5061. The second U-shaped cut 5062 functions in the same manner as in the first embodiment, for rotating the LCD in the range of 2 degrees forward to 90 degrees backward. FIG. 6D shows the said angles of the rotation control unit of FIG. 6A.

Additionally, a number of washers 510 are designed for releasing the friction between the rotation control unit 506 and the shaft base 508, and also for providing the frictional torque. In FIG. 6A, the washers 510, illustrated in an order from left to right, are: a fix washer 520, a rotation control washer 522, and four spring and torque washers 524a, 524b, 524c, and 524d. For achieving the objective of smooth rotation and long-term durability, six washers are preferably used in example 2; however, the number and composition of the washers may be selectively varied to accommodate a wide range of LCD panel sizes, weights, and degrees of mass unbalance. Also, the shaft base 508 has a conjunctive portion 5081, and the rotation control unit and the washers are mounted thereon. Also, there are threaded holes on the other end of the shaft base 508, associated with another threaded holes on the LCD base 204, for securing the shaft base 508 on the base 204 by the use of a bolt.

The supporting frame 410 includes a first sidewall 420 and a second sidewall 430. A first lock pin hole (not shown) and a second lock pin hole 536b are formed on the first sidewall 420 and the second sidewall 430, respectively. Both lock pin holes are provided for mounting the lock assembly 502. Also, a shaft hole 538 is formed next to the second lock pin hole 536b.

During assembly, the conjunctive portion 5081 of the shaft base 508 is inserted through the central opening 5063 of the rotation control unit 506, the shaft hole 538, the washers, and then secured on the second sidewall 430 of the supporting frame 410 by a screw 518. It is noted that the opening of the fix washer 520 and the cross section of the conjunctive portion 5081 are not circular, but tangent to the shaft hole 538 and the openings of other washers. Next, the spring 514 slides on the conjunctive portion 542 of the lock pin 512. The lock pin 512 is then mounted between the first lock pin hole and the second lock pin hole 536b, and secured by a couple ring 516 such as a E type ring. After assembly, the protrusive portion 544 projects beyond the second sidewall 430 by the elastic force of the spring 514. Subsequently, the two housings 207a and 207b and the fastening cover 208 are engaged together so as to fully enclose the supporting frame 210 and the other components.

When the supporting frame 410 is rotated, the protrusive portion 544 of the lock pin 512 moves against the back surface of the rotation control unit 506. While the supporting frame 410 is rotated to a predetermined angle; for example, in a 25-degree tilt backward from the vertical central line, the protrusive portion 544 couples to the first U-shaped cut 5061. Also, a hook 540 situated in the lower edge of the rotation control unit 522. The hook 540 slides along the second U-shaped cut 5062 of the rotation control unit 506, and stops moving when the hook 540 hits the risen edge of the second U-shaped cut 5062, such as point e or point f shown in FIG. 6C. Additionally, the fix washer 520 of FIG. 6A further has a clasp 560, which the clasp 560 is coupled to the fix cut 550 (FIG. 6C) on the edge of the rotation control unit 506.

FIG. 7A is a perspective view of the assembled apparatus for supporting the monitor according to the second embodiment of the invention, while the LCD is vertical to the base. FIG. 7B is a side view of the apparatus of FIG. 7A. The front surface 602 of the supporting frame 410 is a plane for attaching the LCD (not shown in FIG. 7B). In FIG. 7B, the front surface 602 is parallel to the LCD and y-axis, and the base, of the LCD is parallel to x-axis. While the LCD is vertical to the base, the protrusive portion 544 of the lock pin 512 is against the back surface of the rotation control unit 506, and the spring 514 is therefore compressed, as shown in FIG. 7A. Also, the hook 540 actively couples to the second U-shaped cut 5062 of the rotation control unit 506. Simply saying, if the LCD is rotated from the vertical state to 25 degree backward, the protrusive portion 544 slides against the back surface of the rotation control unit 506, while the hook 540 slides from the point e to point f (FIG. 6C) of the second U-shaped cut 5062.

Figure 8B:
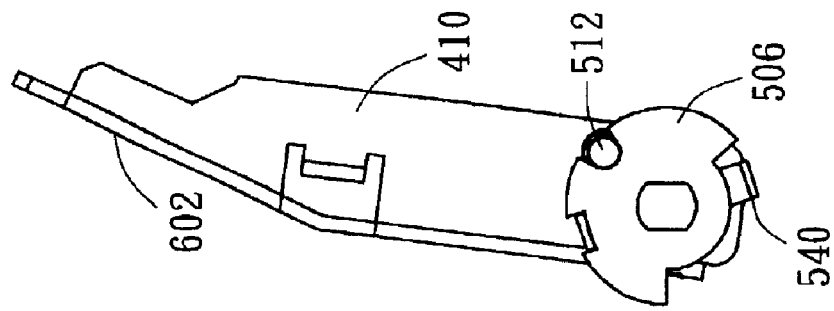
FIG. 8B is a side view of the apparatus of FIG. 8A.
Figure 8A:
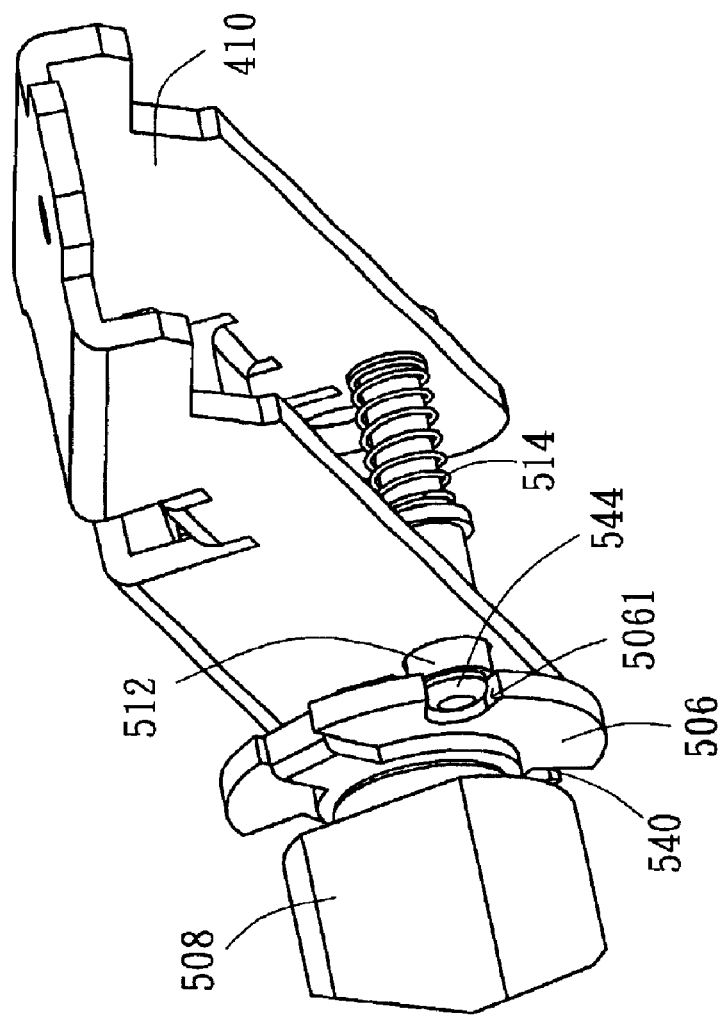
FIG. 8A is a perspective view of the assembled apparatus for supporting the monitor according to the second embodiment of the invention, while the LCD is tilted backward to 25 degrees.

FIG. 8A is a perspective view of the assembled apparatus for supporting the monitor according to the second embodiment of the invention, while the LCD is tilted backward to 25 degrees. FIG. 8B is a side view of the apparatus of FIG. 8A. When the LCD is rotated backward to a predetermined angle such as 25 degrees, the protrusive portion 544 exactly couples to the first U-shaped cut 5061. Meanwhile, the elastic recovery force of the spring 514 acts on the lock pin 512, so that the lock pin 512 is projected beyond the first U-shaped cut 5061, and the rotation of LCD is stopped. Since the lock pin 512 is positioned by a couple ring 516, the lock pin 512 does not drop out of the first U-shaped cut 5061. If folding the LCD to 90 degrees is desired, the pressure between the protrusive portion 544 and the rotation control unit 506 is overcome only by applying an external force. When the protrusive portion 544 is uncoupled from the first U-shaped cut 5061, the LCD can be further rotated and the spring 514 is compressed again.

In practical application, the size and position of the U-shaped cuts of the invention can be selectively varied to accommodate the rotation angle range. For example, if the rotation angle range of LCD is set up as 10 degrees forward to 30 degrees backward, the first U-shaped cut 5061 is shifted to the associated position.

From the above descriptions of the operation of the apparatus for supporting a monitor of the first and second embodiments, it is apparent that the rotation control unit is a key feature of the invention. The rotation angle of the LCD depends on the size of the U-shaped cuts of the rotation control unit. Although the rotation angle range of 2 degrees forward to 25 degrees backward is taken for illustration, the rotation angle of the invention is not limited herein.

According to the aforementioned descriptions, the apparatus for supporting a monitor has several advantages. The mechanical apparatus for supporting a monitor of the invention, using a rotation control unit and a tenon or lock pin, has better a position effect than the conventional supporting apparatus. The LCD equipped with the apparatus for supporting a monitor of the invention is not easy to be aged, and the durability thereof is highly increased. The overall size of the apparatus for supporting a monitor of the invention is reduced, so that the space for connecting the LCD and the base is smaller.

While the invention has been described by way of examples and in terms of preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An apparatus for supporting a monitor, for pivotally connecting the monitor to a base, comprising:
    a supporting frame, having a shaft hole, a hook further formed in a lower end of the supporting frame;
    a latching assembly, comprising:
        a tenon, movably coupled to the supporting frame and shifting between a first position and a second position, one end of the tenon having a protrusive portion; and
        a control bar, connected to the tenon for moving the tenon; and a shaft assembly, mounted in the shaft hole, comprising:
        a shaft base, fixed to the base, one end of the shaft base inserting the shaft hole and receiving with a fastener;
        a rotation control unit, mounted on the shaft base, the edge of the rotation control unit having a first cut and a second cut; and
        a plurality of washers, mounted on the shaft base and fixed to the supporting frame by the fastener;
    wherein when the tenon is situated at the first position, the protrusive portion is coupled to the first cut of the rotation control unit, and the protrusive portion can slide along the edge of the first cut, so as to rotate the monitor relatively to the base in a first angle range, when the tenon is situated at the second position, the protrusive portion is uncoupled from the first cut and the hook slides along the edge of the second cut, so as to rotate the monitor relatively to the base in a second angle range.

2. The apparatus for supporting the monitor according to claim 1, wherein the first position has a tenon hole, and the second position has a second hole.

3. The apparatus for supporting the monitor according to claim 1, wherein the latching assembly further comprises a spring, two ends of the spring are respectively coupled to the supporting frame and the tenon, when the tenon is shifted, the spring is compressed for providing an elastic recover force.

4. The apparatus for supporting the monitor according to claim 1, wherein the rotation control unit has a central opening through which the shaft base inserts.

5. The apparatus for supporting the monitor according to claim 1, wherein the supporting frame has a first sidewall and a second sidewall.

6. The apparatus for supporting the monitor according to claim 5, wherein the hook is formed in the lower end of the second sidewall.

7. The apparatus for supporting the monitor according to claim 5, wherein the first tenon hole and the second tenon hole are respectively formed on the first sidewall and the second sidewall, also the shaft hole is formed next to the second tenon hole.

8. The apparatus for supporting the monitor according to claim 7, wherein the washers are fixed to the second sidewall by the fastener.

9. The apparatus for supporting the monitor according to claim 1, wherein a plurality of threads are formed on the end of the shaft base for receiving the fastener.

10. The apparatus for supporting the monitor according to claim 9, wherein the fastener is a screw.

11. The apparatus for supporting the monitor according to claim 1, wherein a plurality of threaded holes are formed on one end of the shaft base for securing the shaft base on the base by the use of a bolt.

12. The apparatus for supporting the monitor according to claim 1, wherein the washers comprises a fix washer, a plurality of torque washers and spring washers.

13. The apparatus for supporting the monitor according to claim 1, wherein the size of the first cut is associated with the first angle range.

14. The apparatus for supporting the monitor according to claim 1, wherein the size of the second cut is associated with the second angle range.

15. An apparatus for supporting a monitor, for pivotally connecting the monitor to a base, comprising:
   a supporting frame, having a shaft hole, a hook further formed in a lower end of the supporting frame;
   a lock assembly, comprising:
      a lock pin, movably coupled to the supporting frame and shifting between a first lock pin position and a second lock pin position, one end of the lock pin having a protrusive portion; and
      a spring, two ends of the spring are respectively coupled to the supporting frame and the lock pin, when the lock pin is shifted, the spring is compressed for providing an elastic recover force; and
   a shaft assembly, mounted in the shaft hole, comprising:
      a shaft base, fixed to the base, one end of the shaft base inserting the shaft hole and receiving with a fastener;
      a rotation control unit, mounted on the shaft base, the edge of the rotation control unit having a first cut and a second cut; and
      a plurality of washers, mounted on the shaft base and fixed to the supporting frame by the fastener;
   wherein when the lock pin is situated at the first lock pin position, the protrusive portion is against the rotation control unit, and the protrusive portion can slide along a surface of the rotation control unit, so as to rotate the monitor relatively to the base in a first angle range, after the supporting frame is rotated to a predetermined angle, the lock pin can be compressed by an external force and be moved toward the second lock pin position, the protrusive portion is consequently uncoupled from the first cut and the hook slides along the edge of the second cut, so as to rotate the monitor relatively to the base in a second angle range.

16. The apparatus for supporting the monitor according to claim 15, wherein the first lock pin position has a lock pin hole, and the second lock pin position has a second lock pin hole.

17. The apparatus for supporting the monitor according to claim 15, wherein the lock assembly further comprises a couple ring for securing the lock pin.

18. The apparatus for supporting the monitor according to claim 15, wherein the supporting frame has a first sidewall and a second sidewall.

19. The apparatus for supporting the monitor according to claim 18, wherein the hook is formed in the lower end of the second sidewall.

20. The apparatus for supporting the monitor according to claim 18, wherein the first lock pin hole and the second lock pin hole are respectively formed on the first sidewall and the second sidewall, also the shaft hole is formed next to the second lock pin hole.

21. The apparatus for supporting the monitor according to claim 20, wherein the washers are secured to the second sidewall by the fastener.

22. The apparatus for supporting the monitor according to claim 15, wherein a plurality of threads are formed on the end of the shaft base for receiving the fastener.

23. The apparatus for supporting the monitor according to claim 22, wherein the fastener is a screw.

24. The apparatus for supporting the monitor according to claim 15, wherein a plurality of threaded holes are formed on one end of the shaft base for securing the shaft base on the base by the use of a bolt.

25. The apparatus for supporting the monitor according to claim 15, wherein the couple ring is an E type ring for preventing the lock pin from dropping out of the first lock pin position.

26. The apparatus for supporting the monitor according to claim 15, wherein the washers comprises a plurality of rotation control washers, spring and torque washers.

27. The apparatus for supporting the monitor according to claim 15, wherein the position of the first cut is associated with the predetermined angle.

28. The apparatus for supporting the monitor according to claim 15, wherein the size of the second cut is associated with the second angle range.

29. A monitor device, comprising;
   a monitor;
   a base;
   a supporting apparatus, the supporting apparatus has a first end and a second end, wherein the first end of the supporting apparatus is connected to the monitor, and the second end of the supporting apparatus is pivotally connected to the base so that the base can rotate relative to the monitor and move back and forth between a first position and a second position, and wherein the first position is substantially vertically to the base and the second position is substantially parallel to the base.

30. The monitor device according to claim 29, wherein the base is designed as a belt-shaped portion, by which the monitor device can be carried.

31. A monitor device, comprising:
   a monitor;
   a base; and
   a supporting apparatus, the supporting apparatus having a first end and a second end, the first end of the supporting apparatus connecting to the monitor and the second end of the supporting apparatus pivotally connected to the base, the supporting apparatus comprising:
      a supporting frame, having a shaft hole;
      a lock assembly movably coupled to the supporting frame, the lock assembly having a lock pin, the lock pin having a protrusion portion; and
      a shaft assembly, comprising:
         a shaft base, one end of the shaft fixed to the base, the other end of the shaft base inserting the shaft hole; and
         a rotation control unit, mounted on the shaft base, the edge of the rotation control unit having a first cut and a second cut;
   wherein when the protrusive portion is against the rotation control unit between the first cut and the second cut, the monitor moves back and forth between a first position and a second position, when the monitor is relatively rotated to the first position of the base, the protrusive portion is coupling to the first cut, when the monitor is relatively rotated to the second position of the base, the protrusive portion is coupling to the second cut.

32. A monitor device comprising:
   a monitor;
   a base, having a belt-shaped portion for carrying the monitor device, and the belt-shaped portion and the base being integrated as a whole; and
   a supporting apparatus, having a first end and a second end, wherein the first end of the supporting apparatus is connected to the monitor, and the second end of the supporting apparatus is pivotally connected to the base so that the base can rotate relative to the monitor and move back and forth between a first position and a second position, and wherein the first position is substantially vertical to the base and the second position is substantially parallel to the base, wherein the supporting apparatus comprises:
- a supporting frame, having a shaft hole, a hook further formed in a lower end of the supporting frame;
- a latching assembly, comprising:
  - a tenon, movably coupled to the supporting frame and shifting between a first position and a second position, one end of the tenon having a protrusive portion; and
  - a control bar, connected to the tenon for moving the tenon; and
- a shaft assembly, mounted in the shaft hole, comprising:
  - a shaft base, fixed to the base, one end of the shaft base inserting the shaft hole and receiving with a fastener;
  - a rotation control unit, mounted on the shaft base, the edge of the rotation control unit having a first cut and a second cut; and
  - a plurality of washers, mounted on the shaft base and fixed to the supporting frame by the fastener;

wherein when the tenon is situated at the first position, the protrusive portion is coupled to the first cut of the rotation control unit, and the protrusive portion can slide along the edge of the first cut, so as to rotate the monitor relatively to the base in a first angle range, when the tenon is situated at the second position, the protrusive portion is uncoupled from the first cut and the hook slides along the edge of the second cut, so as to rotate the monitor relatively to the base in a second angle range.

33. A monitor device comprising:

a monitor;

a base, having a belt-shaped portion for carrying the monitor device, and the belt-shaped portion and the base being integrated as a whole; and a supporting apparatus, having a first end and a second end, wherein the first end of the supporting apparatus is connected to the monitor, and the second end of the supporting apparatus is pivotally connected to the base so that the base can rotate relative to the monitor and move back and forth between a first position and a second position, and wherein the first position is substantially vertical to the base and the second position is substantially parallel to the base, wherein the supporting apparatus comprises:
- a supporting frame, having a shaft hole;
- a lock assembly movably coupled to the supporting frame, the lock assembly having a lock pin, the lock pin having a protrusion portion; and
- a shaft assembly, comprising:
  - a shaft base, one end of the shaft fixed to the base, the other end of the shaft base inserting the shaft hole; and
  - a rotation control unit, mounted on the shaft base, the edge of the rotation control unit having a first cut and a second cut;

wherein when the protrusive portion is against the rotation control unit between the first cut and the second cut, the monitor moves back and forth between a first position and a second position, when the monitor is relatively rotated to the first position of the base, the protrusive portion is coupling to the first cut, when the monitor is relatively rotated to the second position of the base, the protrusive portion is coupling to the second cut.

* * * * *